United States Patent [19]
Lee

[11] Patent Number: 5,937,046
[45] Date of Patent: Aug. 10, 1999

[54] METHOD OF SELECTIVELY CONNECTING A RECEIVED TELEPHONE CALL BY UTILIZING A CALLING PARTY NUMBER IN A KEYPHONE SYSTEM

[75] Inventor: Yong-Sang Lee, Seoul, Rep. of Korea

[73] Assignee: SamSung Electronics Co., Ltd., Suwon, Rep. of Korea

[21] Appl. No.: 08/867,686

[22] Filed: Jun. 2, 1997

[30] Foreign Application Priority Data

May 31, 1996 [KR] Rep. of Korea ...................... 96-19236

[51] Int. Cl.⁶ ...................................................... H04M 1/00
[52] U.S. Cl. ........................... 379/156; 329/142; 329/164
[58] Field of Search ..................................... 379/142, 215, 379/218, 93.17, 93.23, 158, 162, 164, 165, 198, 202, 205, 209, 157

[56] References Cited

U.S. PATENT DOCUMENTS

| | | | |
|---|---|---|---|
| 5,034,975 | 7/1991 | Grimes | 379/142 |
| 5,263,084 | 11/1993 | Chaput et al. | 379/142 |
| 5,479,493 | 12/1995 | Baker et al. | 379/127 |
| 5,511,115 | 4/1996 | Bayerl et al. | 379/142 |
| 5,550,905 | 8/1996 | Silverman | 379/142 |

FOREIGN PATENT DOCUMENTS 2258119  1/1993  United Kingdom .
2301262  1/1993  United Kingdom .

*Primary Examiner*—Paul Loomis
*Assistant Examiner*—Binh K. Tieu
*Attorney, Agent, or Firm*—Robert E. Bushnell, Esq.

[57] ABSTRACT

A method of making the telephone call by retrieval of a call signal using a calling party number in keyphone system by transmitting data of a calling party number to a keyphone terminal to display the received calling party number on a display window of the keyphone terminal when a keyphone main device receive a call through a central office line, and connecting the corresponding line; sensing the reception of a called signal calling the keyphone terminal on the telephone call through a central office line; sensing the input of the key for selecting a waiting call after off-hook ring service is provided for informing the presence of the waiting call to the keyphone terminal on line when the called signal is sensed; transmitting data of the calling party number corresponding to the waiting call to the keyphone terminal to display the calling party number on the display window when the input of the key for selecting the waiting call is sensed; and interrupting the call on the telephone call and connecting the selected waiting call to the keyphone terminal when the input of key requesting telephone call with the displayed waiting call is sensed. Therefore, the telephone call can be rapidly made for an important or impending call received through central office lines.

10 Claims, 2 Drawing Sheets

METHOD OF SELECTIVELY CONNECTING A RECEIVED TELEPHONE CALL BY UTILIZING A CALLING PARTY NUMBER IN A KEYPHONE SYSTEM

CLAIM OF PRIORITY

This application makes reference to, incorporates the same herein, and claims all benefits accruing under 35 U.S.C §119 from an application entitled Method Of Making The Telephone Call By Retrieval Of A Called Signal Using A Calling Party Number earlier filed in the Korean Industrial Property Office on May 31, 1996, and there duly assigned Ser. No. 19236/1996 by that Office.

BACKGROUND OF THE INVENTION

1. Field of the Invention

The present invention relates to a keyphone terminal of a keyphone system and, more particularly, to a method of selectively connecting a telephone call by retrieving a calling party's number corresponding to a waiting call which is received during the telephone call over a central office line.

2. Description of the Related Art

In a conventional keyphone system, when a called party at one extension receives calls through a plurality of central office lines or from another extension, telephone call service is provided only to the central office line which called first, and the other central office lines are placed in a waiting state until the first telephone call ends. Accordingly, the called party would have no way of knowing whether one or more of the waiting calls was more important than any other call, and the waiting calls could only be answered in the order received.

A well known feature in the art is the transmission of caller identification information or calling line information when a telephone call is made. Such information is useful for a variety of reasons, one of which is to provide a calling party's telephone number to a called party so that the called party can determine whether to answer the call or not. Transmission of caller identification information and calling line information is described, for example, in U.S. Pat. No. 5,550,905 to David P. Silverman entitled Method And Apparatus For Delivering Calls And Caller Identification Information To Multi-Line Users and U.S. Pat. No. 5,479,493 to Albert D. Baker, et al. entitled Calling Line Identification Adjunct For Use With A Communication System, incorporated by reference herein.

SUMMARY OF THE INVENTION

It is an object of the present invention to provide a method and apparatus for selectively answering telephone calls by retrieving each calling party's number and providing selective priority to the calls.

The foregoing and other objects can be achieved according to the principles of the present invention utilizing a method of selectively answering telephone calls by retrieving each calling party's number providing selective priority to the calls in a keyphone system wherein data of a calling party number is transmitted to a keyphone terminal and displayed on a display window of the keyphone terminal when a keyphone main device receives a call through a central office line and the received call is connected to a corresponding keyphone terminal; the reception of a called signal calling the keyphone terminal which is on the telephone call through a central office line is sensed; an off-hook ring service is provided for informing the presence of a waiting call to the keyphone terminal on the telephone call when the reception of the called signal is sensed; a pushing operation of a key for selecting the waiting call is then sensed; data of the calling party number corresponding to the waiting call is transmitted to the keyphone terminal to display the calling party number on the display window when the pushing operation of the key for selecting the waiting call is sensed; and the current call on the called extension is interrupted and the selected waiting call is then connected to the called extension when a key requesting the telephone call is pushed while the displayed waiting call is being sensed.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT

Figure 1:
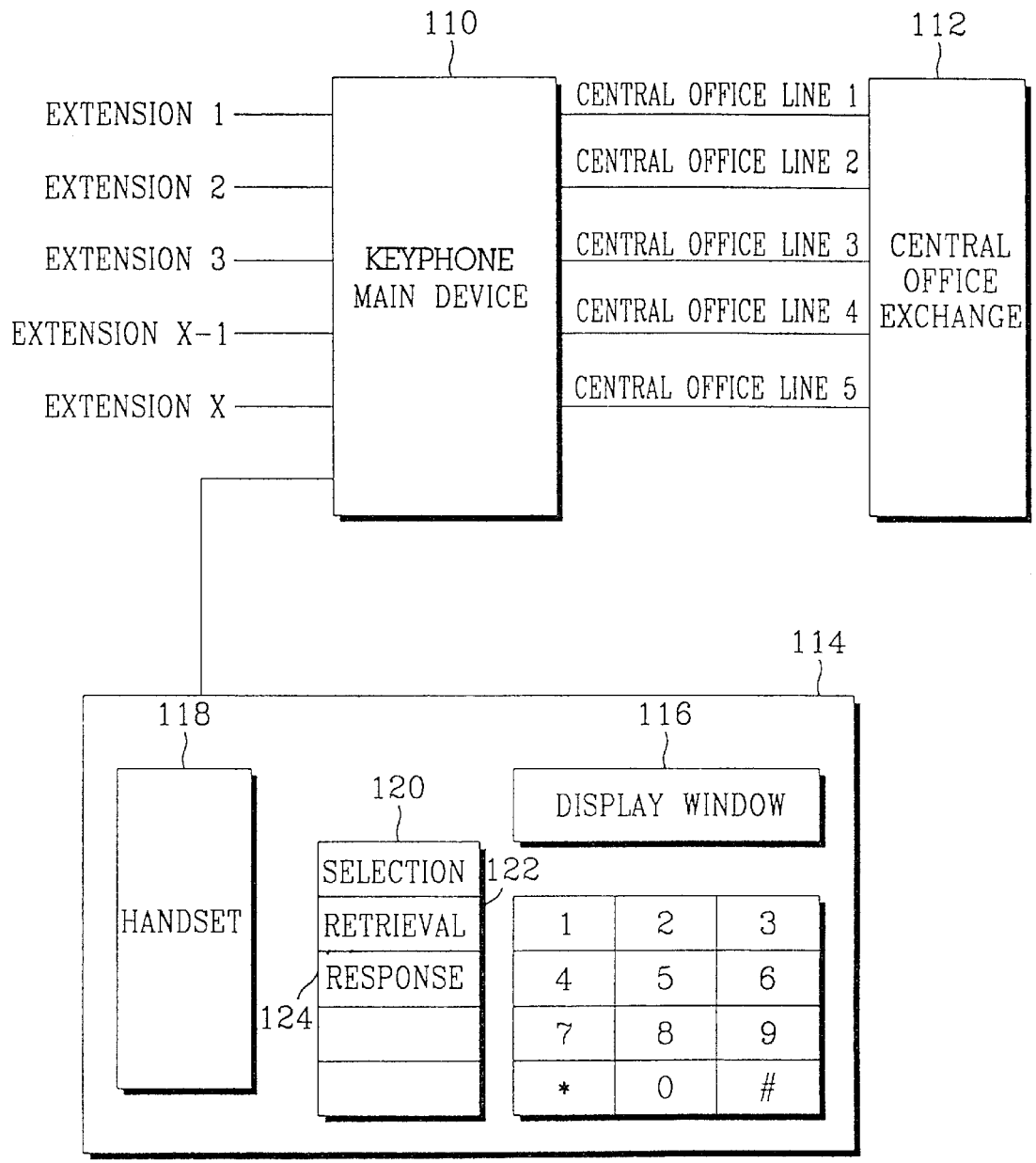
FIG. 1 is a block diagram showing the construction of the keyphone system according to an embodiment of the present invention.

Now, a preferred embodiment of the present invention will be described in detail with reference to the accompanying drawings. Throughout the drawings, it is noted that the same reference numerals or letters will be used to designate like or equivalent elements having the same function. In the following description, numeral specific details such as components composing a concrete circuit, expressions are set forth to provide a more thorough understanding of the present invention. It will be apparent, however, to one skilled in the art that the invention may be practiced without their specific details. The detailed descriptions on known function and constructions unnecessarily obscuring the subject matter of the present invention will be avoided hereinafter.

Referring to FIG. 1, a keyphone main device 110 connects calls received from a central office exchange 112 through central office lines to a corresponding keyphone terminal 114. Central office exchange 112 provides keyphone main device 110 with a calling party number as well as a called signal by the demand of a subscriber. Keyphone terminal 114 is connected to keyphone main device 110 through a line for transmitting data and a line for transmitting aural signals so that a telephone call through central office lines 1–5 or extension telephones 1–X can be made. A display window 116 of keyphone terminal 114 displays the present state of the telephone call. A selection key 120 is used for selecting a calling party number of a waiting call and displaying it on a display window 116. A retrieval key 122 is used for selecting the number, name and date corresponding to the calling party number displayed on display window 116 and displaying them on display window 116. A response key 124 is used for requesting the telephone call with the called signal selected by the selection key 120 be connected to the called extension telephone.

Figure 2:
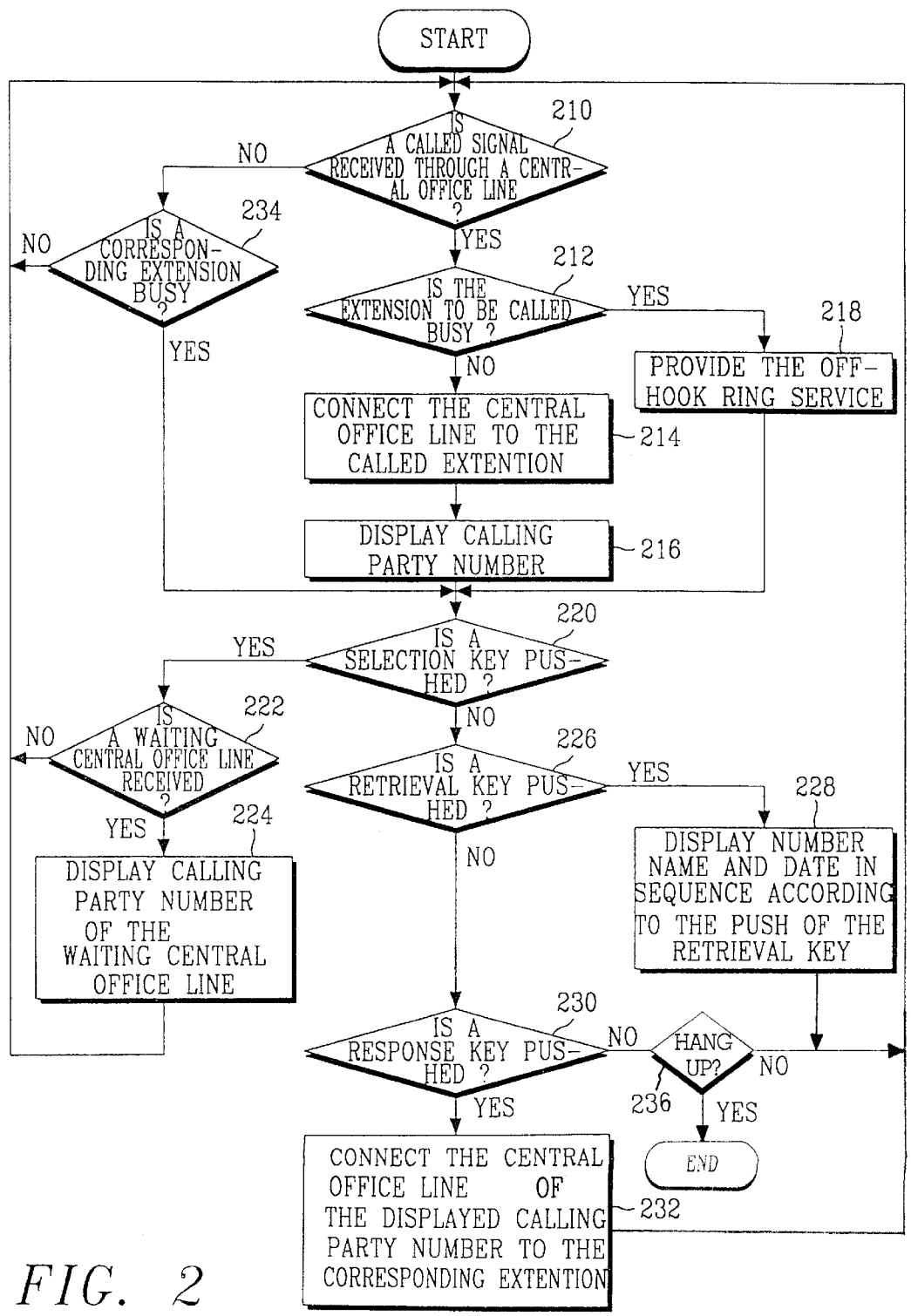
FIG. 2 is a flow chart showing the steps of selectively connecting a telephone call by retrieval of a called signal using a calling party number in the keyphone system according to an embodiment of the present invention.

Referring to FIG. 2, a control flow chart according to an embodiment of the present invention will be described hereafter. At step 210, keyphone main device 110 determines whether or not a called signal, i.e., telephone call, is received through the central office lines from central office exchange 112. When the reception of the called signal is sensed at step 210, keyphone main device 110 determines in step 212 whether or not an extension to be called is busy. When the extension to be called is not busy, the central office line is connected to the called extension in step 214, and data corresponding to the calling party number is transmitted to keyphone terminal 114 for display on display window 116 in step 216 and then the process proceeds to step 220. When it is determined that the extension to be called is busy, an off-hook ring service is provided to keyphone terminal 114 in step 218 for generating a ring back tone to be sent to the calling party and the process proceeds to step 220. When it is determined in step 210 that no called signal is received trough a central office line, keyphone main device 110 determines whether or not a corresponding extension is busy in step 234. If the corresponding extension is not busy step 210 is repeated, however, if the corresponding extension is determined to be busy the process proceeds to step 220.

In step 220, keyphone main device 110 determines whether or not selection key 120 mounted on keyphone terminal 114 is pushed. When a pushing operation of selection key 120 is detected in step 220, the program proceeds to step 222 wherein it is determined whether or not waiting central office line exists. When it is determined in step 222 that a waiting central office line does not exist, the process returns to step 210. When it is determined in step 222 that a waiting central office line does exist, the data corresponding to calling party number of the waiting central office line is transmitted to keyphone terminal 114 according to the sequence of the called waiting office line and displayed in display window 116 in step 224 and the process returns to step 210. Here, it should be noted that the data displayed in display window 116 can be all the calling party numbers corresponding to all the waiting central office lines when selection key 120 is pushed or each calling party number of each waiting central office line can be sequentially displayed upon repeated pushing of selection key 120.

When it is determined in step 220 that selection key 120 is not pushed, it is determined whether or not a pushing operation of retrieval key 122 is sensed in step 226. When it is determined that the pushing operation of the retrieval key 122 is sensed, display window 116 displays the number, the name and the date corresponding to the calling party number of the waiting central office lines are sequentially displayed according to a pushing operation of retrieval key 122 and the process returns to step 210.

When it is determined that a pushing operation of retrieval key 122 is not sensed in step 226, it is determined whether or not a pushing operation of the response key 124 is sensed in step 230. When it is determined that a pushing operation of response key 124 is sensed in step 230, the central office line corresponding to the data displayed in display window 116 is connected to a corresponding extension in step 232 and the process returns to step 210. Note that the pushing operation of response key 124 will interrupt a busy extension and connect the waiting call to the extension, however, the interrupt will place the central office line having the call interrupted in a wait state. When it is determined that a pushing operation of response key 124 is not sensed in step 230, a determination is made in step 236 whether the calling party on the central office line from which the called signal was received has hung up, i.e., determining whether a central office line is in an on-hook state. When it is determined that the calling party has not hung up the process returns to step 210, otherwise the process ends.

Accordingly, an operator utilizing keys 120–124 of keyphone terminal 114 can selectively provide priority to telephone calls received from a central office exchange over the central office lines. Thus, as described above, the present invention provides a method of connecting a telephone call by retrieving the called signals received through central office lines and then giving selective priority to the called signals. Therefore, the telephone call can be rapidly made for an important or impending call received through the central office lines.

While there have been illustrated and described what are considered to be preferred embodiments of the present invention, it will be understood by those skilled in the art that various change and modifications and equivalents may be substituted for elements thereof without departing from the true scope of the present invention. Therefore, it is intended that the present invention not be limited to the particular embodiments disclosed as the best mode contemplated for carrying out the present invention, but that the present invention includes all embodiments falling within the scope of the appended claims.

What is claimed is:

1. A method of selectively connecting a received telephone call by utilizing a calling party number in keyphone system, comprising the steps of:

determining, in a keyphone terminal of said keyphone system, whether a called signal from a central office exchange over a central office line is received;

determining whether an extension to be called is busy, when it is determined that said called signal is received;

connecting said central office line to said extension when it is determined that said extension to be called is not busy and displaying a calling party number on a display of said keyphone terminal;

generating ring back tone when it is determined that said extension to be called is busy;

determining, after connecting said central office line to said extension when it is determined that said extension to be called is not busy and displaying said calling party number on a display of said keyphone terminal or after generating ring back tone when it is determined that said extension to be called is busy, whether a selection key on said keyphone terminal is pushed;

determining whether a central office line is in a wait state, when it is determined that said selection key was pushed;

displaying a calling party number corresponding to a central office line determined to be in a wait state;

returning to said step of determining whether a called signal from a central office exchange over a central office line is received, when it is determined that a central office line is not in a wait state or after displaying said calling party number corresponding to said central office line determined to be in said wait state;

determining whether a retrieval key on said keyphone is pushed when it is determined that said selection key was not pushed;

displaying a number, name and date corresponding to a calling party number of said called signal in sequence when it is determined that said retrieval key was pushed and returning to said step of determining whether a called signal from a central office exchange over a central office line is received;

determining whether a response key on said keyphone terminal is pushed when it is determined that said retrieval key was not pushed; and connecting said central office line to said extension being called when it is determined that said response key was pushed and returning to said step of determining whether a called signal from a central office exchange over a central office line is received.

2. The method as set forth in claim 1, further comprising steps of:

determining whether a corresponding extension is busy when it is determined that said called signal is not received; and performing said step of determining whether said selection key is pushed.

3. The method as set forth in claim 1, further comprising steps of:

determining whether a central office line is in an on-hook state when it is determined that said response key was not pushed;

returning to said step of determining whether a called signal from a central office exchange over a central office line is received when it is determined that said central office line is not in an on-hook sate; and ending said method when it is determined that said central office line is in said on-hook state.

4. An apparatus selectively connecting a received telephone call by utilizing a calling party number in a key telephone system comprising:

means connecting a plurality of extension lines to a plurality of central office lines; and a keyphone terminal connected to said means, said keyphone terminal comprising a selection key, a retrieval key and response key and a display window, wherein said keyphone terminal:

determines whether a called signal from a central office exchange over one of said central office lines is received;

determines whether a called extension is busy, when it is determined that said called signal is received;

connects said one of said central office lines to said called extension when it is determined that said called extension is not busy and displaying a calling party number in said display window of said keyphone terminal;

generates ring back tone when it is determined that said called extension is busy;

determines, after connecting said central office line to said called extension and displaying said calling party number or after generating said ring back tone, whether said selection key is pushed;

determines whether said one central office line is in a wait state, when it is determined that said selection key was pushed;

displays said calling party number corresponding to said one central office line determined to be in a wait state;

again determines whether a called signal from a central office exchange over a central office line is received, when it is determined that a central office line is not in a wait state or after displaying said calling party number corresponding to said one central office line determined to be in said wait state;

determines whether said retrieval key is pushed when it is determined that said selection key was not pushed;

displays a number, name and date corresponding to a calling party number of said called signal in sequence when it is determined that said retrieval key was pushed and again determining whether a called signal from a central office exchange over a central office line is received;

determines whether said response key is pushed when it is determined that said retrieval key was not pushed; and connects said one central office line to said called extension when it is determined that said response key was pushed and again determining whether a called signal from a central office exchange over a central office line is received.

5. The apparatus as set forth in claim 4, wherein said keyphone terminal further determines whether a corresponding extension is busy when it is determined that said called signal is not received; and again determines whether said selection key is pushed.

6. The apparatus as set forth in claim 4, wherein said keyphone terminal further determines whether said one central office line is in an on-hook state when it is determined that said response key was not pushed; and again determines whether a called signal from a central office exchange over a central office line is received when it is determined that said central office line is not in an on-hook state.

7. A method of selectively connecting a received telephone call to a called extension by utilizing a calling party number in keyphone system, comprising the steps of:

detecting, in a keyphone terminal of said keyphone system, a telephone call received over a central office line;

determining whether a called extension is busy, when said telephone call is detected;

performing an off-hook ring service by generating a ring back tone, when it is determined that said called extension is busy;

connecting said central office line to said called extension when it is determined that said called extension is not busy;

determining, after connecting said central office line to said extension when it is determined that said extension to be called is not busy or after generating said ring back tone when it is determined that said extension to be called is busy, whether a selection key on said keyphone terminal is pushed;

determining whether a central office line is in a wait state upon activation of said selection key;

displaying a calling party number, corresponding to said received telephone call, on a display of a keyphone terminal of said keyphone system, when it is determined that the central office line is in a wait state;

returning to said step of detecting a telephone call received over a central office line, when it is determined that a central office line is not in a wait state or after displaying said calling party number corresponding to said central office line determined to be in said wait state;

utilizing said calling party number to determine whether said received telephone call should be promptly answered;

interrupting a conversation between said called extension an another central office line when it is determined that said received telephone call should be answered promptly.

8. The method as set forth in claim 7, wherein said step of utilizing said calling party number to determine whether said received telephone call should be promptly answered comprises:

detecting activation of a retrieval key on said keyphone terminal; and displaying a number, name and date corresponding to said calling party number when said retrieval key is activated.

9. The method as set forth in claim 7, wherein said step of utilizing said calling party number to determine whether said received telephone call should be promptly answered comprises:

detecting activation of a respond key on said keyphone terminal; and connecting said central office line of said calling party number to said called extension when said respond key is activated.

10. The method as set forth in claim 8, wherein said step of utilizing said calling party number to determine whether said received telephone call should be promptly answered further comprises:

detecting activation of a respond key on said keyphone terminal; and connecting said central office line of said calling party number to said called extension when said respond key is activated.

* * * * *